(12) United States Patent
Belov et al.

(10) Patent No.: US 9,017,464 B2
(45) Date of Patent: Apr. 28, 2015

(54) CHROMIUM-FREE SILICATE-BASED CERAMIC COMPOSITIONS

(71) Applicants: Irina Belov, Zionsville, IN (US); Daryl G. Copeland, Greenwood, IN (US)

(72) Inventors: Irina Belov, Zionsville, IN (US); Daryl G. Copeland, Greenwood, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 168 days.

(21) Appl. No.: 13/673,007

(22) Filed: Nov. 9, 2012

(65) Prior Publication Data

US 2015/0090154 A1    Apr. 2, 2015

(51) Int. Cl.
 *C23C 22/48*  (2006.01)
 *C23C 22/05*  (2006.01)
 *C09D 5/08*   (2006.01)
 *C23C 30/00*  (2006.01)

(52) U.S. Cl.
 CPC .. *C09D 5/08* (2013.01); *C23C 30/00* (2013.01)

(58) Field of Classification Search
 USPC .............. 106/14.21, 623; 427/376.2; 428/446
 See application file for complete search history.

(56) References Cited

U.S. PATENT DOCUMENTS

| 3,248,251 A | | 4/1966 | Allen | |
|---|---|---|---|---|
| 3,615,781 A | * | 10/1971 | Schneider et al. | 106/626 |
| 3,721,574 A | * | 3/1973 | Schneider et al. | 106/623 |
| 4,219,358 A | * | 8/1980 | Hayashi et al. | 106/1.17 |
| 6,368,394 B1 | | 4/2002 | Hughes et al. | |
| 6,761,934 B2 | * | 7/2004 | Heimann et al. | 427/430.1 |
| 7,789,953 B2 | | 9/2010 | Mosser et al. | |
| 7,993,438 B2 | | 8/2011 | Mosser et al. | |
| 2006/0166014 A1 | | 7/2006 | Klotz et al. | |

FOREIGN PATENT DOCUMENTS

| EP | 0 142 418 A1 | 5/1985 |
|---|---|---|
| EP | 0 295 834 A1 | 12/1988 |

OTHER PUBLICATIONS

AlSeal 5000 Data Sheet, www.coatingsforindustry.com, Rev.Jan. 2010.
Mosser et al. "Progress in the Development of Chrome-Free Turbine Engine Coatings". Tri-Service Corrosion Conf. 2007.
Petry et al. "Evaluation of Chromium-Free Alternative Coatings for Aircraft Engine Applications". Tri-Service Corrosion Conf. 2005.

* cited by examiner

*Primary Examiner* — Anthony J Green
(74) *Attorney, Agent, or Firm* — Nilay S. Dalal

(57) ABSTRACT

A composition based on a certain chromium-free silicate-based binder is described. The one-part slurry composition is an aqueous solution of lithium-doped potassium silicate in combination with an aluminum or aluminum alloy powder. The one-part slurry composition produces a corresponding coating exhibiting improved performance at a reduced coating thickness.

15 Claims, 20 Drawing Sheets

(10 of 20 Drawing Sheet(s) Filed in Color)

Top view SEM images of Lithium doped Potassium Silicate based coatings:
5 8 A composition at magnifications X500(a) and X2000(b)

X500

X2000

Top view SEM images of Lithium doped Potassium Silicate based coatings:
*8 7 A* composition at magnifications X500(a) and X2000(b)

Top view SEM images of Li-doped K Silicate based coatings after burnishing with beads: magnifications X500(a) and X2000(b)

Cross-section SEM images of Li-doped K Silicate based coatings: as-cured (a) and after burnishing with beads (b)

AlSeal 5K coatings on 1010 steel panels: after 1000 hrs Salt Spray exposure

Thickness = 2.7mils     2.5 mils     1.6mils     1.1 mils

AlSeal 5K coatings on 1010 steel panels: after Heat (700F/23 hrs + 1075F/4.5 hrs) + 400hrs Salt Spray exposure

Thickness=1.3 mils     1.7 mils      1.9 mils      2.2 mils

Mixed Na – Li silicate binder based coatings on 1010 steel panels: after Heat (700F/23 hrs + 1075F/4.5 hrs) + 168hrs Salt Spray exposure

Lithium silicate binder based coatings on 1010 steel panels:
Cross-hatch (a) and as-cured coating surface (b) under optical microscope Lithium silicate binder – 40 wt. % Al coatings on 1010 steel panels:
after 1000 hrs Salt Spray exposure (a) and after Heat (700F/23 hrs + 1075F/4.5 hrs) + 48hrs Salt Spray exposure (b)

Sodium silicate binder based coatings on 1010 steel panels:
after 380 hrs Salt Spray exposure Sodium silicate binder based coatings on 1010 steel panels:
after Heat (700F/23 hrs + 1075F/4.5 hrs) + 168hrs Salt Spray exposure Potassium silicate binder based coatings on 1010 steel panels:
optical microscope after cross-hatch test Potassium silicate binder based coatings on 1010 steel panels:
after 1000 hrs Salt Spray exposure (a) and after Heat (700F/23 hrs + 1075F/4.5 hrs) + 400hrs Salt Spray exposure (b)

Lithium doped Potassium Silicate binder based coating 32D: optical microscope of as-cured coating (a) and after cross-hatch test (b)

Lithium doped Potassium Silicate binder based coating *32D*: after 1200 hrs Salt Spray exposure (a) and after Heat (700F/23 hrs + 1075F/4.5 hrs) + 400hrs Salt Spray exposure (b)

**Lithium doped Potassium Silicate binder based coatings: optical microscope pictures (X40) of *47A* (a), *58A* (b) and *87A* (c) as-cured coatings**

Lithium doped Potassium Silicate binder based coatings:
47A (a), 58A (b) and 87A (c) coatings after Salt Spray exposure for 1000 hrs
and 58A (d) and 87A (e) for 1700 hrs
*After 1000 hrs in Salt Spray*
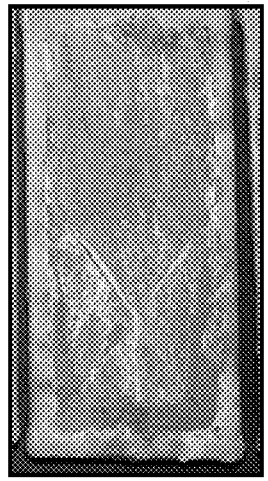 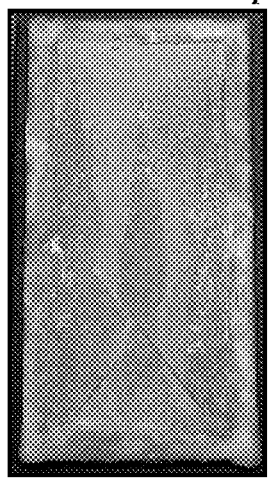 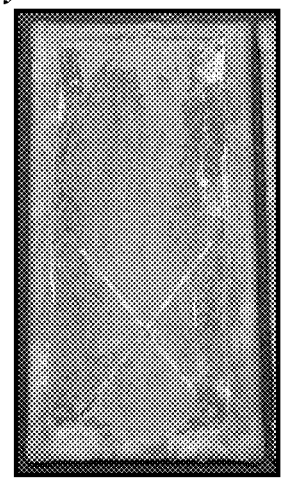
FIG. 17(a)   FIG. 17(b)   FIG. 17(c)
*After 1700 hrs in Salt Spray*
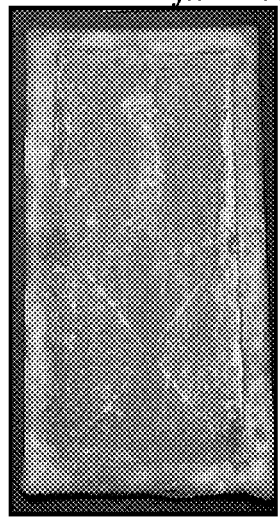 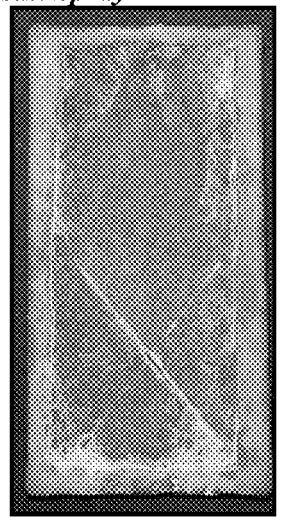
FIG. 17(d)   FIG. 17(e)

**Lithium doped Potassium Silicate binder based coatings after Heat (700F/23 hrs + 1075F/4.5 hrs) + 400hrs Salt Spray exposure: *58A* (a) and *87A* (b)**

AlSeal 5K coatings on 1010 steel panels: optical microscope of cross-hatch area before (a) and after (b) boiling water immersion
X6
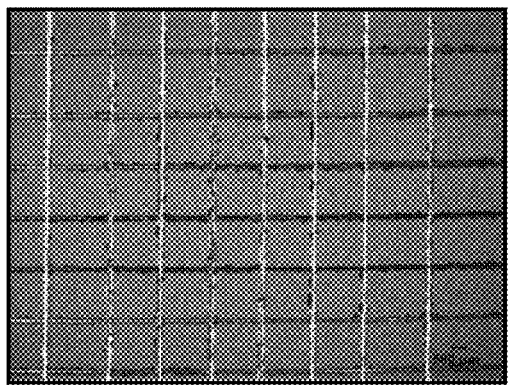 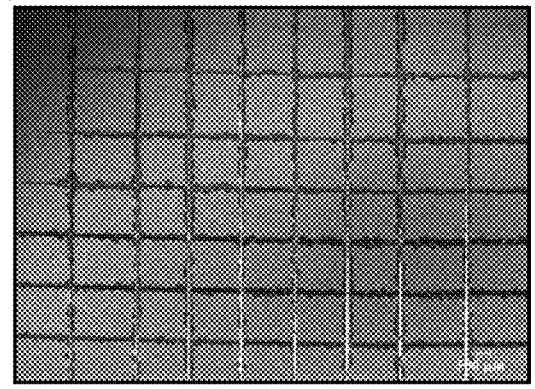
FIG. 19(a)　　　　　　　　FIG. 19(b)
Lithium doped Potassium Silicate binder based coating 58A on 1010 steel panels: optical microscope of cross-hatch area before (a) and after (b) boiling water immersion
X6
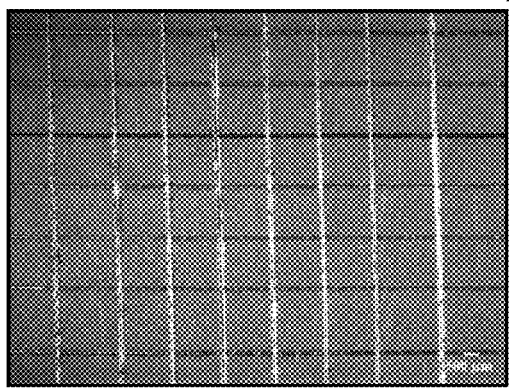 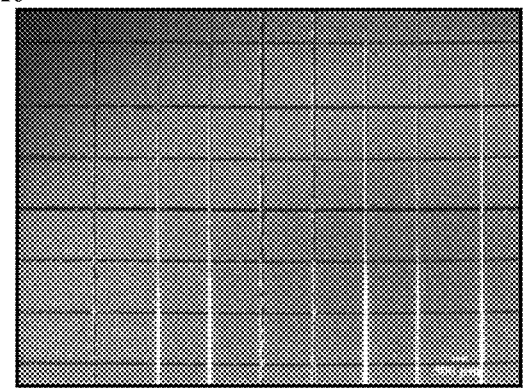
FIG. 20(a)　　　　　　　　FIG. 20(b)

AlSeal 5K as-cured coating on 1010 steel: optical microscope

Cyclic Heat + Salt Spray test after 10 cycles: AlSeal 5K (a), *58A* (b) and SermeTel® W (c)

Thickness = 1.7 mils    1.2 mils    1.9 mils

US 9,017,464 B2

CHROMIUM-FREE SILICATE-BASED CERAMIC COMPOSITIONS

FIELD OF THE INVENTION

The present invention relates to novel silicate-based slurry formulations which are chromium-free and suitable in the production of protective coatings exhibiting superior corrosion and heat resistance and capable of replacing traditional chromate-containing coatings.

BACKGROUND OF THE INVENTION

Chromium-based aluminum-ceramic coating compositions have been well known and considered for decades as the industry standard for forming coatings which are highly corrosion-resistant and heat-resistant. U.S. Pat. No. 3,248,251 to Allen over forty years ago recognized and described the ability of aluminum-ceramic chromium-based coatings to exhibit resistance to corrosion, heat and abrasion while retaining adhesion and flexibility. Such attributes have continued to make aluminum-ceramic coatings widely used in a variety of applications. Today, these coatings are relied upon by original equipment manufacturers (OEM's) in the aircraft industry for protection of various aircraft engine components subject to high temperature and corrosive environments. Department of Defense (DoD) depot facilities also use aluminum-ceramic coatings as part of their manufacturing for critically needed items. Additionally, the automotive industry and various other industries routinely use aluminum-ceramic coatings as a high performance protective coating.

The conventional aluminum-ceramic coating typically consists of a chromate-phosphate binder that is filled with metallic aluminum powder. Upon curing, the binder forms a matrix that is embedded with the aluminum powder particles. The matrix provides mechanical integrity to the coating, while the chromate passivated aluminum pigment network imparts efficient corrosion protection. Burnishing Al-filled coating by dry grit or glass bead-blasting compresses the coating to render it conductive, galvanically active and sacrificial (i.e., cathodically protective) to all steels. SermeTel W® is recognized in the industry as the performance standard for these types of coatings. Depending on the particular application and service conditions, the coating can be used alone to provide adequate corrosion protection. Alternatively, the coating can be utilized as a part of an overlay system, serving as a basecoat that is sealed with top coatings and/or sealers. By sealing porosity and voids in the basecoat, the top coating provides additional barrier protection, thereby extending the corrosion protective action of the whole overlay system, as well as enhancing its other functional properties (e.g., such as smoothness, temperature resistance, etc.) and its visual appearance.

Notwithstanding the wide spread utility of aluminum-ceramic coatings, hexavalent chromium Cr(VI) has been identified as an environmentally hazardous material of concern. Consequently, it has been targeted for elimination in accordance with recent changes in the policies of the DoD, Air Force and various OEM's. The effect has created a need for Cr-free high performance coatings that can exhibit properties at least the same as that of the aluminum-ceramic coatings with Cr-based binders.

In response to the identification of hexavalent chromium Cr(VI) as an environmentally hazardous material, various Cr-free coatings have been investigated as potential replacement coatings. For instance, one alternative Cr-free coating considered is an aluminum ceramic basecoat layer having a phosphate-based binder. The coating when employed in conjunction with Cr(VI)-free top coating, provides application properties (e.g., thickness, roughness, galvanic activity) and performance (e.g., salt spray corrosion resistance, high temperature heat oxidation resistance, erosion resistance, mechanical properties) comparable to the benchmark coating systems with SermeTel W® basecoat. Furthermore, when used alone, these basecoats with a phosphate-based binder exhibited corrosion resistance when exposed up to 500 hours in the Salt Spray test per ASTM B117. However, as a basecoat, the coatings developed a red rust in the scribe and the field when subject to more prolonged testing of up to 1000 hrs. Another drawback of this approach stems from a significant interaction of aluminum particles with the phosphate binder in a water-based slurry in the absence of Cr(VI) species that have a passivating effect on aluminum metal. As a result of this adverse interaction of the aluminum particles with the phosphate binder, the basecoat slurry cannot be maintained as a "one-part" composition, in which all of the constituents can be mixed together into a single formulation, without one or more of the constituents adversely affecting other constituents of the composition. Rather, the slurry must be maintained in storage as a two-part slurry, in which the aluminum powder is maintained separate from the aqueous binder, until the point of use when the binder and Al can be mixed. However, the pot life of the mixed slurry is only about 8 hours, beyond which a rapid deterioration of the mixture is observed, that manifests itself in agglomeration of Al particles leading to a significant increase in the particle size. Although some specific modifications to the aluminum ceramic coatings employing phosphate-based binders can improve the pot life to over 24 hrs, the slurries must undesirably remain a two-part slurry to avoid the adverse interaction of the aluminum particles with the phosphate binder.

As another alternative, aluminum ceramic coatings with silicate-based binders have been considered. One type of Cr-free, silicate-based binder is generally described in US Patent Pub. No. 2006/0166014. However, basecoat performance appears to be dependent upon layer thickness, with increased coating thicknesses to at least 2 mils being required for sufficient corrosion resistant properties, There is a continuing need for improved one-part Cr-free coatings which can provide improved mechanical and functional properties, including corrosion and heat resistance, at a reduced coating thickness.

SUMMARY OF THE INVENTION

The invention relates, in part, to a slurry formulation used to produce coatings with special properties. Choices in starting binder materials and specific combinations of the binder materials and the metallic ceramic powders have been found to affect the morphology and microstructure of the coating, resulting in a coated product that has superior properties that is particularly advantageous for aerospace applications.

It has been found that utilizing a chromium-free silicate-based binder that is lithium-doped potassium silicate in combination with an aluminum powder produces a ceramic coating exhibiting improved functional properties, in particular resistance to corrosion and heat exposure while retaining adhesion and flexibility. The coating layer is continuous, dense and defect-free. The slurry can contain both the powder and binder so that the starting material is a one-part composition in which all constituents are pre-mixed as a single formulation. The one-part composition remains sufficiently stable to exhibit long shelf-life.

In a first aspect, an aqueous slurry composition for the production of a coating on a substrate is provided. The composition comprises an aqueous binder comprising a lithium-doped potassium silicate solution in water. The binder is characterized by an absence of chromium. The slurry further includes an aluminum or aluminum alloy powder. The aluminum or aluminum alloy powder and the binder are contained as a one-part composition, each of which is contained in a predetermined weight ratio.

In a second aspect, a coating composition for a substrate is provided. The coating composition comprises a ceramic matrix that does not contain chromium. The matrix is formed by lithium doped potassium silicate-binder and a plurality of aluminum particles embedded within the matrix. The silicate and the aluminum are contained in a predetermined ratio.

In a third aspect, a method for applying a coating onto a substrate is provided. The process comprises providing an aqueous one-part slurry comprising lithium doped potassium silicate aqueous binder in which the binder is characterized by an absence of chromium. An aluminum powder is incorporated into the binder in a predetermined ratio. The aqueous one-part slurry is applied onto a surface of the substrate to form a basecoat layer. The basecoat layer is then cured.

BRIEF DESCRIPTION OF THE DRAWINGS

The specification contains at least one photograph executed in color. Copies of this patent or patent publication with color photograph(s) will be provided by the Office upon request and payment of the necessary fee.

The objectives and advantages of the invention will be better understood from the following detailed description of the preferred embodiments thereof in connection with the accompanying figures wherein like numbers denote same features throughout and wherein:

FIGS. 17(a) through 17(e) show salt spray test results for the coatings of the present invention after 1000 and 1700 hrs exposure;

FIGS. 19(a) and 19(b) show results of the boiling water immersion test for the coating of Comparative Example 1;

FIGS. 20(a) and 20(b) show results of the boiling water immersion test for the coatings of the present invention;

DETAILED DESCRIPTION OF THE INVENTION

Figure 1A:
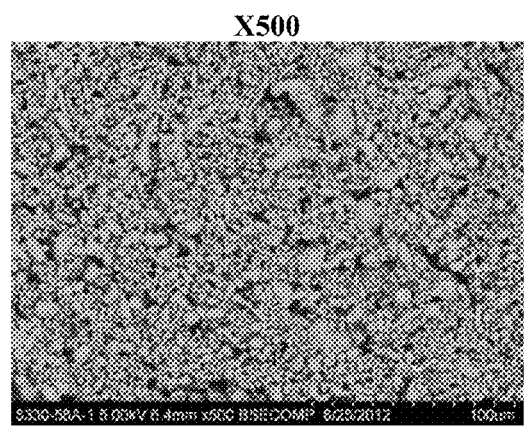
FIGS. 1(a) and 1(b) show top view SEM images at a magnification of ×500 and ×2000, respectively, for a coating prepared from a slurry of the present invention.

The relationship and functioning of the various elements of this invention are better understood by the following detailed description. However, the embodiments of this invention as described below are by way of example only.

An aqueous slurry composition of the present invention can be used to apply a protective coating onto various solid substrates, including, by way of example, ferrous alloys, nickel alloys, nickel-cobalt alloys, and other metallic (such as aluminum alloys, cobalt alloys, etc.) and nonmetallic thermally stable surfaces (such as ceramics). While ferrous alloy substrates are preferred, any solid substrate may be suitable for the application of the coating of the present invention, on the condition that the solid substrate is preferably capable of withstanding coating processing temperatures of about 650° F.

An aqueous slurry composition for production of a coating in accordance with one aspect of the present invention comprises a silicate binder and aluminum or aluminum alloy powder incorporated into the binder in a predetermined weight ratio. The silicate binder does not contain Cr and therefore is an environmentally safe material. The silicate Cr-free binder is an aqueous solution of lithium-doped potassium silicate. "Lithium-doped potassium silicate" as used herein means that predetermined amounts of lithium ions displace potassium ions in the silicate structure, as well as in the cured silicate matrix. The silicate can contain potassium and lithium in a ratio of $K_2O:Li_2O$ ranging between 20:1 to 3:1, more preferably in the ratio of $K_2O:Li_2O$ ranging between 15:1 to 4:1, and most preferably in the ratio of $K_2O:Li_2O$ ranging between 11:1 to 7:1, with all ratios expressed herein by weight. The ratio of silicate to potassium $Si_2O:K_2O$ can range from 2:1 to 6:1, more preferably from 2:1 to 3:1, and most preferably from 2.4:1 to 2.8:1. The most preferable silicate composition can be represented by a weight ratio of $Si_2O:Me_2O$ ranging from 2.1:1 to 2.6:1 where $Me_2O=K_2O+Li_2O$.

It has been discovered in the present invention, as will be shown in the examples, that employing a lithium-doped potassium silicate based binder with aluminum powder incorporated therein provides a surprisingly synergistic effect of improvements in functional properties (e.g., corrosion resistance, corrosion—heat resistance) as well as structural and adhesion properties of the coatings, in comparison to binders based on other silicates. This synergism was most noticeable, when compared to the binders based on individual lithium silicate and potassium silicate.

In a preferred embodiment, the aluminum powder is contained in the slurry in a range between about 20-60 wt %, more preferably 30-50 wt % and most preferably 35-45 wt %, based on the total weight of the slurry.

The ratio of lithium-doped potassium silicate to aluminum powder, Li-doped K silicate:Al, in the slurries of the present invention ranges from about to 0.12:1 to 0.50:1, more preferably from 0.18:1 to 0.46:1 and most preferably, from 0.22:1 to 0.37:1.

The balance of the slurry compositions of the present invention constitutes water, which dissolves Li-doped K silicate to form an aqueous binder. Optionally, other functional additives known in the art can be incorporated into the binder. By way of example, corrosion inhibitors can be utilized to further inhibit or passivate metal substrate corrosion. Surfactants can also be employed to improve properties, such as, for example, slurry sprayability, substrate wetting and film forming properties. The binder and aluminum particles are inter-dispersed as a one-part slurry composition. It was discovered that in the slurries of the present invention, Al particles exhibit adequate stability when in contact with the binder. There are no observable indicators of chemical reaction (such as, for example, gas evolution, volume expansion, temperature increase, viscosity increase). Accordingly, the present invention does not necessitate storing the binder and aluminum powder separate from one another and delaying mixing of the binder and the powder prior to applying the slurry onto a substrate—as is the case for some Cr-free phosphate binder based slurries known in the art. The one-part slurry composition of the present invention has a relatively long shelf-life of several months under ambient conditions.

In a preferred embodiment, although slurry compositions of the present invention are particularly useful for forming basecoat compositions when combined with aluminum particulates, it should be recognized that the present invention contemplates the use of any suitable metallic particulates. For example, fine particles of various aluminum alloys (such as aluminum-silicon, aluminum-copper or aluminum-magnesium) can be used with the lithium-doped potassium silicate-based binder of the present invention. Other illustrative metal powders that can be used in the slurry and coating compositions are zinc, nickel and silicon. The selection of the specific type of metal powder can be dependent upon numerous factors, including the functional properties desired in the end-use application and the properties resulting from utilizing any of these metal powders, as are known in the art.

In other embodiments, ceramic powders, by way of example, but not intending to be an exhaustive list, can include aluminum oxide, zirconium oxide, silicon oxide, chromium oxide, silicon carbide or boron nitride can be incorporated into the binder of the present invention. The choice of a particular ceramic material can be dependent upon numerous factors, including the intended service conditions of a coated part.

When Al particles are employed in the slurries of the present invention, such particles may be spherical inert-gas atomized, air atomized, flakes or mixtures thereof. The aluminum particles preferably have a size that is suitable to inter-disperse within the silicate-based binder. It is well known in the art that absolute numbers measured for particle size and particle size distribution for particulate systems, such as pigment powders and pigment containing slurries, are dependent on testing and/or measurement technique and instrumentation. Thus, the particle size D50 and D90 numbers of the present invention as disclosed herein have been obtained via laser diffraction techniques employing MicroTrac SRA Particle Analyzer as a particle measuring equipment. As used herein, "D50" refers to a median particle size in which 50 percent of the particles are smaller and 50 percent are larger than the median particle size, and "D90" refers to a $90^{th}$ percentile particle size in which ninety percent of the particles are smaller than the $90^{th}$ percentile particle size.

In one embodiment, the air atomized aluminum powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns; this powder will be referred to further as Al powder "Type AA". In another embodiment, the spherical inert-gas atomized aluminum powder comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns; this powder will be referred to further herein as Al powder "Type SA". Aluminum powder Type SA is finer than Type AA powder.

The slurry compositions of the present invention can be applied to a substrate by any number of conventional application techniques known in the art, such as by spraying, brushing, dipping, dip-spinning and the like. The applied layer is dried, and then cured. The binder solution polymerizes and solidifies under a drying and curing cycle to form a continuous matrix with acceptable mechanical strength, flexibility and chemical resistance. Al particles are embedded in the matrix. As evident to one of skill in the art, applicable curing regimes may include higher temperatures for shorter time or lower temperatures for longer time.

The coating is generally applied to a thickness of between 0.5 to 3.0 mils, with a preferable thickness between 0.8 to 1.6 mils. Such a coating thickness can be built up in one layer (i.e., one application-drying-curing cycle), or multiple layers with two or more cure cycles, if desired. The minimum thickness is determined by a need to provide a continuous layer covering a substrate. The maximum thickness of the basecoat layer is generally determined by a targeted or specified thickness of the entire multilayer overlay system. It is customary and desirable not to apply a coating in excess of functional requirements for a particular application. For example, typical coating thicknesses for turbine compressor applications is less than 3 mils (75 μm), while on some components (such as, for example, compressor blades and vanes) the coating thickness should be typically less than 2 mils.

As will be demonstrated further in the Examples, the Cr-free coatings of the present invention deliver required functional protective performance at lower thickness as compared to other Cr-free coatings that were tested. The Li-doped K silicate binder based slurries of the present invention are capable of forming a basecoat-only layer that meets various OEM specifications at thickness lower than 2 mils. For example, the coating exhibits corrosion resistance for over 1,000 hrs (per ASTM B117), high resistance in heat-corrosion cycles, low erosion rate and resistance to boiling water and other engine fluids. Such a basecoat-only layer comprises a matrix that provides the necessary mechanical strength to the coating, along with adhesion to the substrate. Upon curing of the Li-doped K silicate based layer, formation of a glass-ceramic matrix occurs having a structural integrity noticeably improved over other conventional silicate-based layers.

Figure 1B:
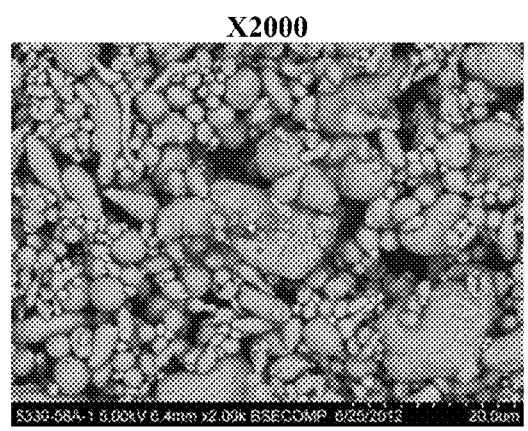

The surface morphology and microstructure of the coatings of the present invention will now be described. Optical microscopy and scanning electron microscopy (SEM) analysis were performed for investigation of surface morphology and microstructure for all coatings discussed herein. FIGS. 1(a)-1(b) and FIGS. 2(a)-2(b) show SEM photomicrographs of the surface morphologies and microstructures of the Li-doped K silicate-based Cr-free coatings in the as-cured state. In particular, FIGS. 1(a) and 1(b) show SEM top view images at a magnification of ×500× and ×2000, respectively, for a coating prepared from a slurry of the present invention in which the slurry and the coating derived from this slurry are designated as "58A". The 58A slurry utilizes the aluminum powder Type AA. The aluminum powder concentration in the 58A slurry is 36 wt %, based on the overall weight of the slurry. The weight ratio of the silicate-based binder to Al particulates is 0.34:1 (Table 1).

The coating produced from the 58A aqueous slurry was prepared by spraying the 58A slurry on 1010 low carbon steel substrates. The substrates were degreased and abraded by grit-blasting with aluminum oxide media (220 mesh size) prior to the coating spraying. The aqueous slurry was allowed to dry at 175° F. for 15 minutes and then subsequently cured at 650° F. for 30 minutes.

Figure 2A:
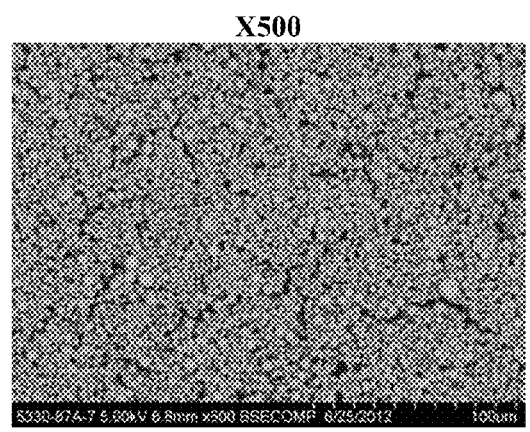
FIGS. 2(a) and 2(b) show top view SEM images at a magnification of ×500 and ×2000, respectively, for another coating prepared from another slurry of the present invention.
Figure 2B:
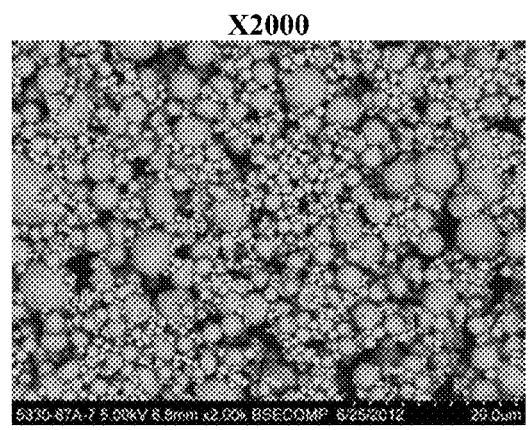

FIGS. 2(a) and 2(b) show top view SEM's at a magnification of ×500 and ×2000, respectively, for a coating prepared from a slurry of the present invention having a formulation designated as "87A" (Table 1). 87A utilizes spherical aluminum powder Type SA. Al concentration, and the weight ratio of silicate-based binder to aluminum particles are the same as with the 58A formulation. The coating 87A was applied identical to that of the 58A composition. As can be seen in FIGS. 2(a) and 2(b), slurry 87A employing smaller, spherical Type SA Al particles produces a denser packed coating as compared to the 58A slurry that employs the larger Type AA aluminum particles. The smaller Al particle size also translates into smoother surface finish and thinner as-cured coatings, as shown in Table 1. Surface roughness measurements ("Ra") for all tests performed herein were performed by Mitutoyo Surftest 301 (at a 5.1 mm traverse and 0.030" (0.76 mm) cutoff). Thickness measurements for all of the coating layers performed herein were measured by FisherScope MMS® instrumentation.

TABLE 1

| Coating Formulation | Al Powder Type | Al content, wt % | Ratio of Silicate/Al | Thickness, mils | Ra, µin as cured |
| --- | --- | --- | --- | --- | --- |
| 58A | AA | 36 | 0.34:1 | 1.4 | 37-44 |
| 87A | SA | 36 | 0.34:1 | 1.1-1.2 | 26-29 |

The same effect of particle size and morphology of Al particles on the microstructure of the applied coatings is also observed for other compositions of the present invention. For example, in addition to the 58A and 87A coatings, two other slurry compositions designated as 131A and 131C (shown in Table 2) have been coated onto low carbon steel substrates as described above with respect to the 58A and 87A coating samples. Both 131A and 131C slurries utilize the Li-doped K silicate-based binder in a ratio of silicate to Al lower than that shown for the formulations in Table 1, and with a higher Al content than that shown for the formulations in Table 1. The 131A and 131C formulations are identical to each other except for the 131A incorporating larger Al particles (i.e., same particle size as in 58A) than the 131C coating sample. Other two slurry compositions designated as 52A and 52B (also shown in Table 2) have been coated onto low carbon steel substrates; these compositions have even higher Al content and, correspondingly, lower ratio of the Li-doped K silicate to Al. Consistent with Table 1, the formulations in Table 2 show that the smaller Al particles (i.e., Al Powder Type SA) provide smoother as-cured coatings.

TABLE 2

| Coating Formulation | Al Powder Type | Al content, wt % | Ratio of Silicate/Al | Thickness, mils | Ra, µin as cured |
| --- | --- | --- | --- | --- | --- |
| 131A | AA | 40 | 0.29:1 | 1.8-1.9 | 28-29 |
| 131C | SA | 40 | 0.29:1 | 1.8-1.9 | 20-22 |
| 52A | AA | 42 | 0.27:1 | 0.8-1.0 | 34-39 |
| 52B | SA | 44 | 0.25:1 | 1.3-1.4 | 23-26 |

As-cured Cr-free basecoats of the present invention, similar to the chromate-containing SermeTel W® benchmark and Cr-free base coatings of the prior art, are not electrically conductive and thus are capable of providing only barrier protection, but not capable of providing galvanic corrosion protection to the substrate. However, the coatings can be made electrically conductive by any of the treatments widely used in the art for this purpose such as, for example, burnishing with glass beads, using an abrasive media at low processing pressure or heating at temperatures of 1000° F. The treatments can therefore render the inventive coatings galvanically protective against corrosion to an underlying substrate.

Burnishing the coatings of the present invention with glass beads makes the coatings conductive. In this regard, measurements of less than 5Ω can be typically obtained, which is well below a value of less than 15Ω that is generally required by OEM Specifications. The electrical resistance of grit-burnished coatings is measured by a standard resistivity meter with the probes being placed on the surface of the coating one inch apart.

Figure 3A:
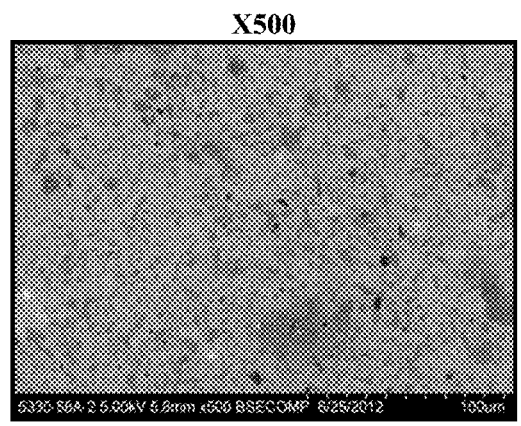
FIGS. 3(a) and 3(b) show top view SEM images at a magnification of ×500 and ×2000, respectively, of the coating sample of FIGS. 1(a) and 1(b) after it has been burnished with glass beads.
Figure 3B:
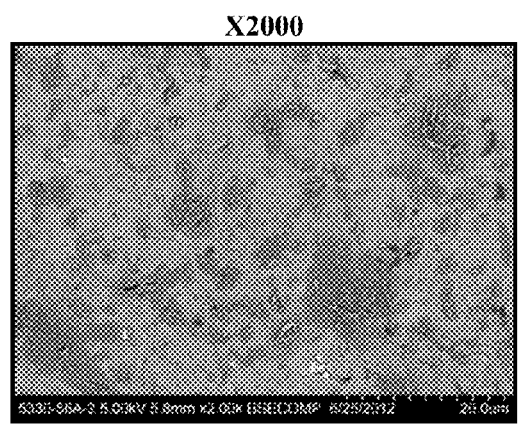

FIGS. 3(a) and 3(b) show top view SEM micrographs at a magnification of ×500 and ×2000, respectively, for the coating 58A as-burnished with glass beads. Generally speaking, the energy imparted to the coating from the pressurized media particles during the burnishing alters the aluminum particle shape, thereby causing densification of the coating. As seen from FIGS. 3(a) and 3(b), burnishing compresses the as-cured coating and forms a modified coating layer. Specifically, the compression imparts a substantial change in the coating surface microstructure. The aluminum particles are flattened, which results in coating densification and closure of the pores. These changes provide continuous contact between the aluminum particles, thereby rendering the coatings conductive. Similar to FIGS. 3(a) and 3(b), the SEM photomicrographs for the other coatings of the present invention that are burnished also exhibit favorable particle shape change, pore closure and layer densification.

Figure 4A:
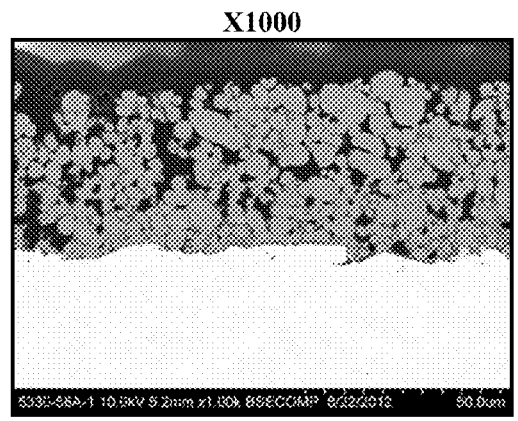
FIGS. 4(a) and 4(b) show cross-section SEM images at a magnification of ×1000, of the coating sample of FIGS. 1(a) and 1(b) before and after it has been burnished with glass beads, respectively.
Figure 4B:
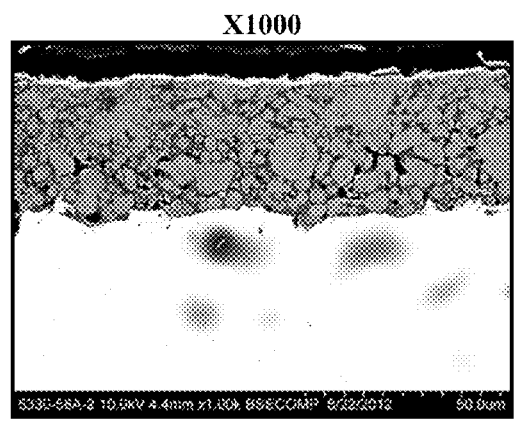

As seen from SEM data for 58A coating cross-sections in the as-cured and bead-burnished conditions (FIGS. 4 (a) and 4(b), respectively), the change in the coating microstructure under bead impact occurs not only on the surface, but also to a significant depth of about 15-20 μm. The denser, less porous layer of the burnished coating of FIG. 4b) can provide the benefit of additional barrier protection for the substrate.

As will be shown and discussed below in the Examples, the inventors have performed extensive experiments to compare the slurry composition of the present invention with other slurry compositions. The Comparative Examples clearly demonstrate that employing a silicate-based binder containing only Li ions or a silicate-based binder containing only K ions produced poor mechanical and functional properties. However, the combination of K and Li in predetermined amounts in the silicate-based binder structure created a synergistic effect that improved mechanical properties of the matrix and the functional performance of the coatings. Without being bound by any particular theory, it is believed that this synergistic effect is caused, at least in part, by the partial Li ion substitution for K ions in the cured silicate glass matrix structure.

The testing methodology described above when investigating surface morphology and microstructure was also employed when characterizing various formulated slurries, in the Examples described below. Additionally, slurries were further characterized by their pH, viscosity, specific gravity and solids content. These parameters, together with D50 and D90, were monitored to test stability and aging of the slurries.

Each of the coatings in Comparative Examples 1 through 5 and in the Working Examples 1 through 4 were applied onto respective substrates and cured in a similar manner. Specifically, panels of 1010 and 4130 steel were initially surface treated by grit-blasting with 100 mesh grit. The slurry to be tested was then sprayed onto the panels. Thereafter, the slurry was allowed to dry at 175 F for 15 min, and then cured at 650 F for 0.5 hr to form basecoat-only layers.

Various tests were subsequently conducted to evaluate performance of the protective coatings of the present invention. In particular, a battery of specific, rather demanding tests was performed to demonstrate suitability of these coatings for protection of various gas turbine engine parts. Typically, requirements for turbine compressor coating applications include relatively high corrosion resistance, sacrificial toward base metal (i.e., coated and scribed "X" panels should not show any metal substrate rusting for up to 1,000 hrs in ASTM B117 Salt Spray test), heat resistance, as well as resistance to corroding under combined, cyclic exposure to heat and Salt Spray. Additionally, the coatings should be resistant to hot water and engine fluids exposure. As will be shown in the Working Examples below, the coatings derived from Cr-free slurries of the present invention are capable of meeting and exceeding these demanding requirements. Furthermore, the slurries of the present invention perform on par with the benchmark Cr(VI) containing coating SermeTel W® and outperform various other prior art Cr-free coatings that were tested.

Mechanical and functional properties of the prepared coatings were tested as follows. Coatings adhesion to a substrate and inter-layer adhesion were tested by cross-hatch tape (per ASTM D3359) and bend tests. In ASTM D3359 test method, a crosscut grid of scribe lines 1 mm apart was cut into the coating through to the substrate. Standard adhesive tape as defined by ASTM D3359 was then applied to the grid and peeled back at a 180° angle. Adhesion was determined by the amount of coating removed by the tape. Also, optical microscope evaluation (×6) of cross-hatch region was performed and found to be very informative. In the bend test, 90° bend of a coated panel around a 0.22" diameter mandrel was performed followed by evaluation of the area around the bend for any defects such as cracking, peeling or delamination.

Salt Spray testing of burnished (220 mesh grit) & scribed coatings on 1010 panels was performed per ASTM B117 for at least 1000 hours, and in some cases, over 1,500 hours. Heat resistance of the coatings on 4130 panels was tested at 850° F. for greater than 500 hrs. Heat resistance (700° F./23 hrs+ 1075° F./4 hrs) test combined with Salt spray was performed using as-cured (650° F./0.5 hr) and post-cured (1000° F./90 min) coatings on 1010 panels. After heat exposure, the coatings were scribed and exposed to Salt Spray (per ASTM B117) for 400 hrs.

Cyclic heat and Salt Spray test used the coated & scribed 4130 panels. Samples were heated at 850° F. for 7.5 hrs, then cooled to a room temperature and placed into Salt fog for 15.5 hrs; the samples were rinsed with de-ionized H2O and dried prior to going into the next thermal part of the cycle. A total of 10 cycles were performed.

With regards to the hot water resistance test, coatings on 1010 panels were placed in boiling H2O for 10 min, then cooled and air-dried for 3 hrs, followed by cross-hatch and bend adhesion tests performed as described above.

The fuel resistance test was performed on coated 1010 panels immersed for 24 hrs at room temperature.

The hot oil resistance test was performed on coated 1010 panels immersed in SAE Di-ester Test Fluid at 400° F. for 8 hrs.

Erosion resistance of the coatings was tested using 50 μm Al2O3 media at the pressure of 25 psi. Such erosion test conditions are required by one of the major OEMs.

While the preferred embodiments of the inventive slurry and coating formulation has been set forth above, the following examples are intended to provide a basis for comparison of the present invention slurries and coatings, with other silicate-based slurries and coatings, but they are not to be construed as limiting the invention.

Comparative Example 1

A commercially available Cr-free slurry was tested that comprised a silicate based binder mixed with Al particles. The slurry that was employed in the present Example, had a measured pH of 11.46; a measured specific gravity of 1.52 g/cc; #2 Zahn cup viscosity=19 sec; % Solids=54.9 wt %; and a PSD characterized by a measured D50 of 5.7 μm and a measured D90 of 13.7 μm.

The composition of the binder in the slurry was a mixture of sodium and lithium silicates contained in a weight ratio of Na:Li of 5:1. The coatings derived from this slurry were applied and cured as described above, and which was in agreement with the manufacturer's recommendations.

Although mechanical properties (e.g., adhesion, bend, erosion resistance) of these coatings were found to be satisfactory, the coatings were observed to have rather significant limitations in their functional properties.

Figures 5A, 5B, 5C, 5D:
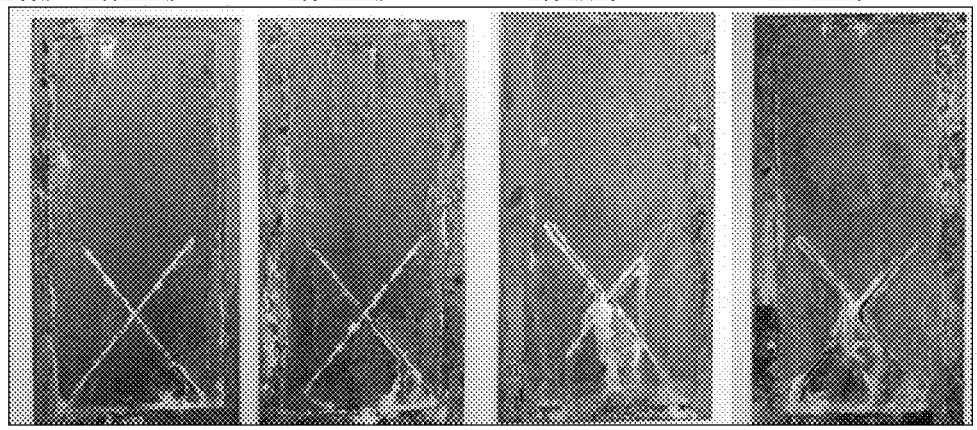
FIGS. 5(a) through (d) show coatings with different thickness that were produced from a commercially available Cr-free silicate binder based slurry of Comparative Example 1 and exposed to Salt Spray for 1000 hrs.
Figure 6A:
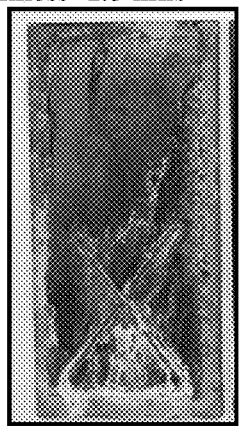
FIGS. 6(a) through (d) show coatings of Comparative Example 1 with different thicknesses that were and exposed to the Heat plus Salt Spray for 400 hrs.
Figure 6B:
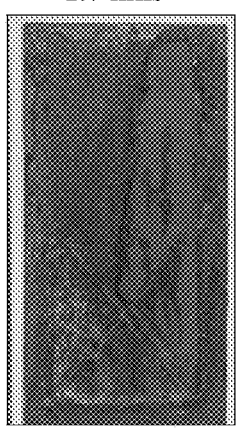
Figure 6C:
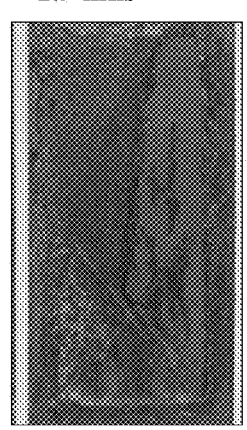
Figure 6D:
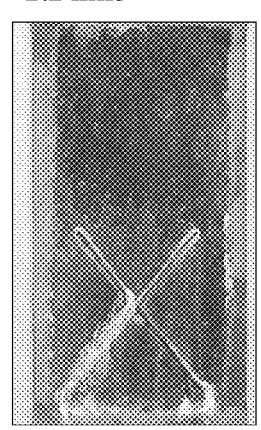

Corrosion resistance performance (per ASTM B117) was tested on the coatings prepared on 1010 steel panels with different coating thicknesses in the range from 1.1 mils to 2.7 mils. Burnished and "X" scribed panels were exposed to a continuous fog of atomized sodium chloride for 1000 hrs. Corrosion levels in the scribe and surrounding field were then observed. Representative results are shown in FIGS. 5(a)-5(d). The results indicated that relatively thick coatings must be applied to provide required corrosion protection for 1,000 hrs exposure. Specifically, the required thickness of the coatings was approximately 1.6 mils or greater (FIG. 5 a-c), while red rust in the panel scribed "X" and surrounding field were observed for the coatings of lesser thickness (FIG. 5d).

These coatings at the minimum thickness limitations were determined to perform even worse in the heat plus corrosion resistance testing. This testing was carried out on 4 coating samples having respective thicknesses of 1.3 mils, 1.7 mils, 1.9 mils and 2.2 mils. Each of the coated panels were heated in a furnace to 700° F. for 23 hrs, followed by 1075° F. for 4 hrs. After the heat exposure, the coated panels were exposed to a continuous salt fog for 400 hrs pursuant to ASTM B-117. Results are shown in FIGS. 6(a)-6(d). It was observed that the coating was capable of passing this test, with required exposure to the salt fog for 400 hrs, only when the coating thickness was greater than 2 mils (FIG. 6(d)). Red rust in the panel scribe and surrounding field was observed for the other panels shown in FIGS. 6(a) and 6(b) after only 48 and 96 hrs of salt spray exposure, respectively. Red rust in the panel scribe and surrounding field was also observed for the panel shown in FIG. 6(c), which had a coating thickness of 1.9 mils.

The above tests clearly show that this basecoat performance was strongly dependent on the coating thickness: satisfactory corrosion and heat plus corrosion resistance required a relatively thick coating of at least 2 mils. These thickness limitations could potentially create a disadvantage for particular applications.

Thus, experimental results in Comparative Example 1 indicated that, although such chromium-free, mixed Na—Li silicate-based commercially available coatings can provide corrosion resistance up to 1000 hrs, as well as adequate performance in cyclic heat-corrosion tests and meets some OEM Aircraft Specifications, the basecoat performance was found to be strongly dependent upon layer thickness. Increased coating thickness to at least 2 mils was required to meet the OEM Aircraft Specifications. Further, the microstructural pattern of the coatings exhibits so-called "mud-cracking", defined herein as a series of non-contiguous cracks in random orientations within the coating layer. The mud-crack morphology was believed to be a detriment to various physical properties of the coatings. For example, the mud-cracking was found to cause inferior adhesion of the coating when subject to boiling water. Additionally, the mud-cracking may have been responsible for the reduced resistance to heat-corrosion tests that was observed.

Furthermore, additional data (as will be discussed in Example 3 below) related to performance in other tests, revealed limitations of this particular coating composition as compared to the coating compositions of the present invention.

Comparative Example 2

The relative amounts of Na and Li in the mixed Na—Li silicate-based binder formulation in Comparative Example 1 were modified to determine if improved performance could be achieved. Slurries were prepared using mixtures of aqueous solutions of Na silicate and Li silicate with Al powder incorporated into the slurry formulation at 40 wt % content. Li silicate with a ratio of $SiO_2:Li_2O$ of 8.2, and Na silicate with a ratio of $SiO_2:Na_2O$ of 3.2 were employed. One slurry was prepared using a mixture of 70 wt % of Na silicate and 30 wt % Li silicate (the slurry further denoted herein as "Na—Li Sil A"), and another slurry was prepared using a mixture of 50 wt % Na silicate and 50 wt % Li silicate (the slurry further denoted herein as "Na—Li Sil B"). Both slurries had the same weight ratio of mixed Na—Li silicates to aluminum particulates equal to about 0.34:1, and utilized Aluminum powder of the Type AA (i.e., the $50^{th}$ percentile of the particle size distribution has a diameter of between about 4 to 7 microns and the $90^{th}$ percentile of the particle size distribution has a diameter of less than or equal to about 11.5-15.5 microns). Each of the slurries was coated onto 1010 steel panels with a thickness of approximately 1.0 mils and thereafter tested.

Figures 7A, 7B:
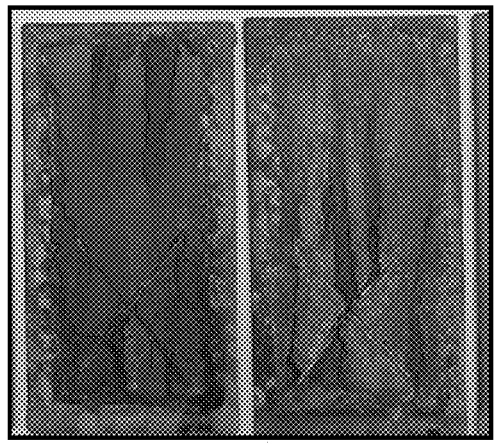
FIGS. 7(a) and 7(b) show coatings that were produced from two slurries based on mixed Na—Li silicate binders and exposed to Heat plus Salt Spray for 168 hrs.

Although both Na—Li Sil A and Na—Li Sil B coatings demonstrated good adhesion properties and performance in the salt spray testing, in which no red rust was developed in the scribe or field for over 1,000 hrs of testing per ASTM B117, the results for heat resistance (700° F./23 hrs+1075° F./4 hrs) test combined with Salt spray was not satisfactory. Significant amounts of rust developed in the field and scribe for both coatings, after only 48 hrs, and the panels became completely rusty after 168 hours exposure to the salt fog (see FIG. 7 (a) for the Na—Li Sil A coating and FIG. 7(b) for the Na—Li Sil B coating)

These results, combined with the data in Comparative Example 1 and Comparative Example 2, indicate that slurries with silicate-based, Cr-free binders that employ a mixture of Na and Li silicates, irrespective of their concentrations, have minimum thickness requirements and fail to deliver corrosion resistance performance when utilized at reduced coating thicknesses.

Comparative Example 3

Lithium silicate-based binders were prepared using an aqueous solution of Li silicate with a ratio of $SiO_2:Li_2O$ of 8.2 (same as utilized in the Comparative Example 2). Aluminum powder Type AA or Type SA were employed in preparation of the various coating formulations. The aluminum content in the formulations included 35 wt. % and 40 wt. % content, based on the total weight of the slurry, such that the ratio of Li silicate to Al was equal to about 0.34:1 and about 0.26:1, respectively. Some of the slurries of the formulations also contained various additives, such as, for example, Cr-free corrosion inhibiting compounds. The slurries were applied onto steel 1010 panels as described above to form coatings that were tested.

Figure 8A:
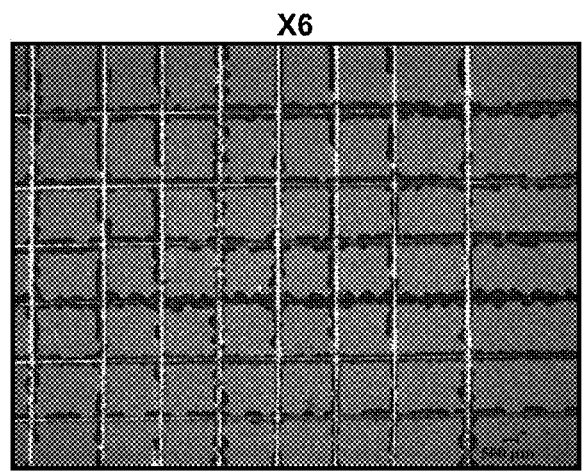
FIGS. 8(a) and 8(b) show optical microscope pictures of a coating that was produced from Li silicate binder based slurry: 8(a) shows results of a cross hatch adhesion test at a magnification of ×6 and 8(b) shows morphology of a coating surface at a magnification of ×40.
Figure 8B:
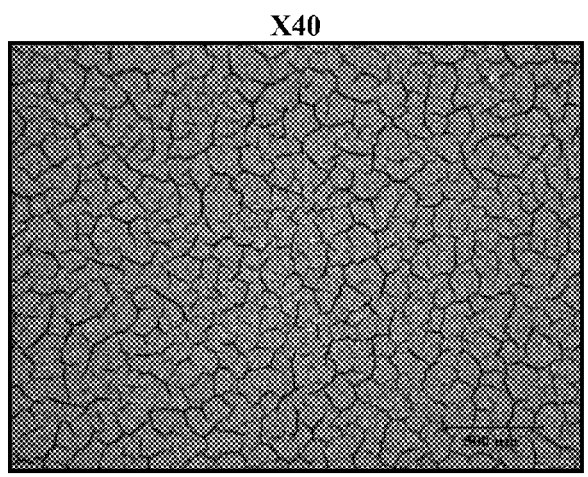

All samples showed satisfactory bend adhesion tests. However, the cross-hatch adhesion test showed rather poor coating adhesion to the substrate, that deteriorated even further at 40% aluminum content (i.e. with lower silicate:Al ratio) and the larger Al particles. As seen on FIG. 8a, there was a heavy loss of the coating on the cross-hatch pattern. Without being bound by any particular theory, it is assumed that this poor adhesion is caused by extensive "mud-cracking" (see optical microscope micrograph in FIG. 8b) that was observed for Li silicate based coatings.

The corrosion resistance for Li silicate based formulations showed that all the formulations containing 35 wt % Al powder had red rust in the scribe after only 500 hrs exposure to a salt fog. Increasing aluminum content to 40 wt % led to a significant increase in corrosion resistance in which no red rust development was observed up to 1200 hrs.

Figure 9A:
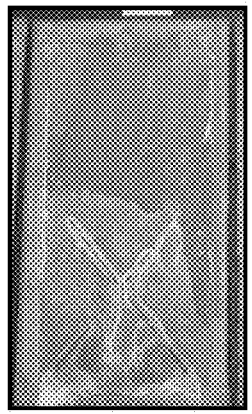
FIGS. 9(a) and 9(b) show coatings employing Li silicate-based binders after salt spray test and after the heat plus salt spray test.
Figure 9B:
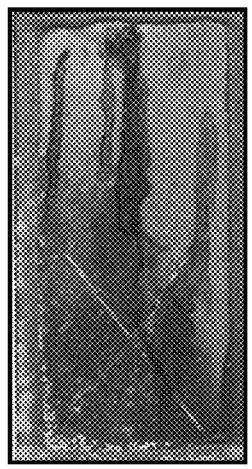

Although increasing the aluminum content to 40% improved salt spray corrosion results, all Li silicate-based formulations demonstrated poor performance in the heat plus salt spray test. FIG. 9 shows red rust developed in the scribe and field after only 48 hrs of salt exposure. FIG. 9 is representative of the extent of corrosion observed in the other test panels for Li silicate-based formulations subjected to the heat plus salt spray test. Incorporation of various corrosion inhibitors was attempted in order to improve performance of Li silicate based coatings, such as for example Cr-free anticorrosive pigment HEUCOPHOS®ZPA. However, none of the inhibitors imparted any positive effects to the coatings.

Comparative Example 4

Sodium silicate-based binders were prepared using an aqueous solution of high module Na silicate having a weight ratio of SiO2:Na2O of 3.2. Both types of aluminum powder (i.e., Type AA and the finer particle Type SA) were employed in preparation of the various coating formulations. The aluminum content in the formulations included 35 wt. % and 40 wt. % content, based on the overall weight of the slurry; ratio of Na silicate to Al was varied from 0.47:1 to 0.34:1. Some of the formulations also contained various additives, for example, Cr-free corrosion inhibitors. The slurries were applied onto steel 1010 panels as described above to form coatings having thicknesses ranging from 1.1-1.7 mils. The coatings were subsequently tested.

Figure 10:
FIG. 10 shows results of the salt spray test for coatings employing the Na silicate-based binder.
Figure 11:
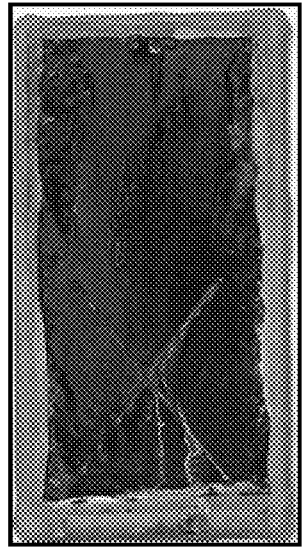
FIG. 11 shows results of the heat plus salt spray test for coatings employing the Na silicate-based binder.

All of the coatings demonstrated acceptable adhesion to 1010 substrates on the basis of both the cross-hatch and bend adhesion tests. However, all of the Na silicate-based coatings demonstrated poor corrosion performance on the basis of the salt spray tests and the heat plus salt spray testing. FIG. 10 is representative of the poor salt spray performance after only 380 hrs exposure time for all of the Na silicate-based coatings. Rust was observed in the field and scribe. FIG. 11 is representative of the poor heat plus salt spray performance observed after only 168 hrs exposure to the salt spray and deteriorating further with increased exposure time of 288 hrs.

Attempts were made to improve performance of Na silicate-based coatings by introducing various corrosion inhibitors and additives, such as anticorrosive pigment HEUCOPHOS® ZPA. However, none of the inhibitors and additives provided required corrosion resistance of the coatings.

Comparative Example 5

Potassium silicate-based binders were prepared using an aqueous solution of K silicate having a weight ratio of SiO2:K2O of 2.5. Type AA aluminum powder was employed for preparation of the coating formulations, with Al content in the formulations equal to 40 wt. %, based on the total weight of the slurry, with the ratio of K Silicate:Al being in the range from 0.20:1 to 0.25:1. The slurries were applied onto steel 1010 steel panels as described above to form coatings having a thickness of 1.4-1.6 mils that were subsequently tested.

Figure 12:
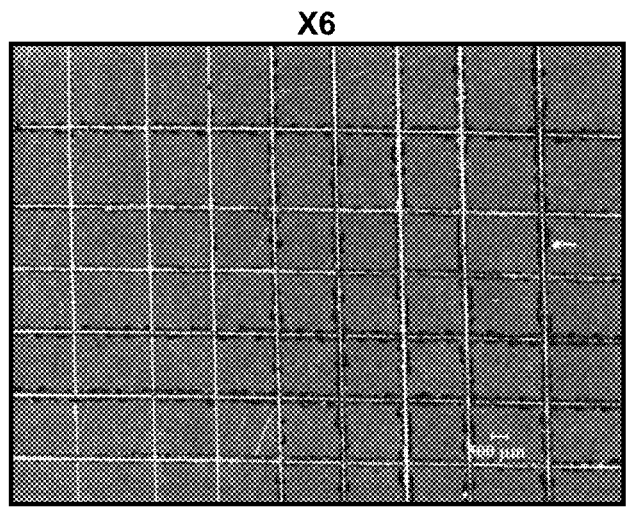
FIG. 12 shows results shows results of a cross hatch adhesion test at a magnification of ×6 for coatings employing the K silicate-based binder.
Figure 13A:
FIGS. 13(a) and 13(b) show coatings employing K silicate-based binders after salt spray test and after the heat plus salt spray test.
Figure 13B:
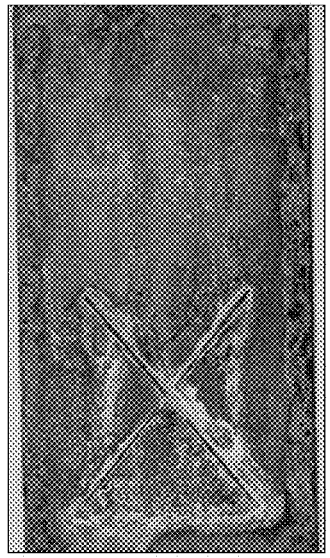

It was observed that K silicate based coatings demonstrated poor adhesion to the substrate, as shown in FIG. 12. As far as corrosion resistance of these coatings was concerned, although the K silicate based coatings performed better than Na silicate based coatings, significant amounts of red rust were still observed after 1000 hrs of salt spray exposure per ASTM B117 (FIG. 13(*a*)). FIG. 13*b* showed the K silicate based coatings also failed in the heat plus salt spray tests.

Example 1

A Lithium doped Potassium silicate-based, Cr-free slurry in accordance with the principles of the present invention was prepared using an aqueous solution of Li-doped K silicate having a $Si_2O:Me_2O$ weight ratio of 2.4:1 where $Me_2O=K_2O+Li_2O$, and ratio of $K_2O:Li_2O=8.2:1$ by weight. Aluminum powder of Type AS was employed in preparation of this slurry, with Al content of 40 wt. %, based on the overall weight of the slurry such that the ratio of Silicate:Al was equal to 0.34:1; this slurry is further referred to herein as "32D".

The slurry was applied onto steel 1010 and/or 4130 steel panels as described above to form coatings having thicknesses of about 1.0-1.1 mils. The coatings were subsequently tested.

Figure 14A:
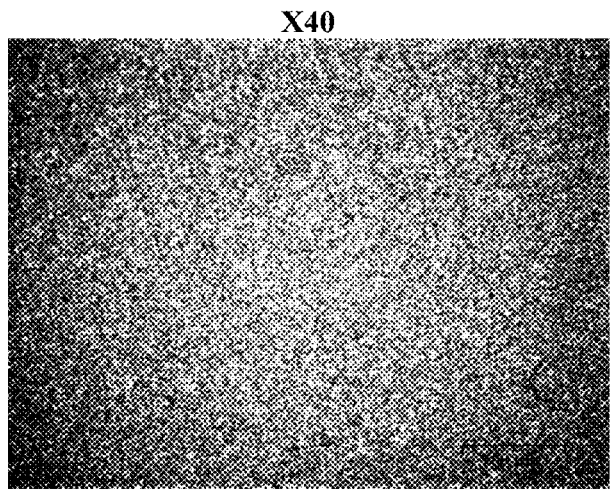
FIGS. 14(a) and 14(b) show optical microscope pictures of the coating formulation of the present invention: 14(a) shows morphology of a coating surface at a magnification of ×40 and 14(b) shows results of a cross hatch adhesion test at a magnification of ×6.
Figure 14B:
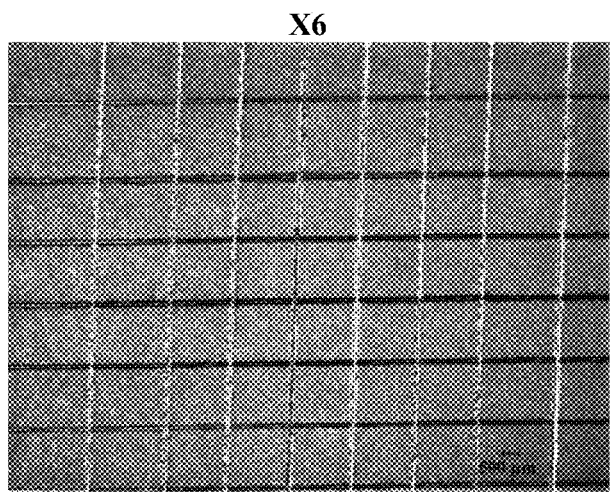

The coatings derived from the 32D slurry were observed to be uniform and showed no defects (FIG. 14*a*), as demonstrated by optical microscopy. The 32D coatings demonstrated superior adhesion to the steel substrates (FIG. 14*b*). Taking into account that individually, Li silicate (see FIG. 8*a*) based binders and K silicate (see FIG. 12) based binders provided relatively poor adhesion, there was evidently a critical difference in the structure and mechanical properties of the matrix formed by the cured Li-doped K silicate binder, as compared to the individual Li and K silicate based binders. Without being bound by any particular theory, this structural synergy may be attributed to the partial Li substitution for K ions in the cured silicate glass matrix structure and manifests itself by a drastic improvement of the matrix mechanical properties, thus providing a superior adhesion of the coating.

Coatings 32D passed all performance tests. The same synergistic behavior of Li-doped K Silicate binder, as compared to both individual K Silicate and Li Silicate binders, was also observed in the coatings corrosion resistance and heat plus corrosion resistance performance: the formulations of the present invention demonstrated significantly better performance in these tests.

Figure 15A:
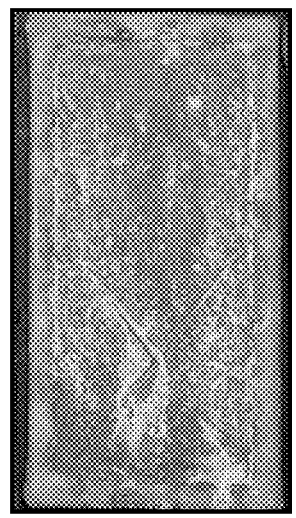
FIGS. 15(a) and 15(b) show results for the salt spray test and heat plus salt spray test of the coating of the present invention.
Figure 15B:
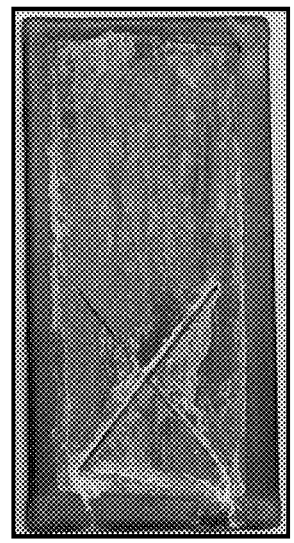

Corrosion resistance test on the basis of ASTM B117, after exposure to salt spray for up to 1200 hrs (FIG. 15(*a*)) indicated the absence of any rust in the scribe and field. FIG. 15(*b*) exhibited no corrosion from the heat plus salt spray exposure for 400 hrs. The coating formulation of the present invention exhibited superior performance in all tests, when compared to that of Comparative Examples 1-5. Again, the synergistic performance of a binder based on Li doped K silicate was unexpected in view of the poor performance results of individual Li and K silicates, when each was tested separately in Comparative Examples 3 and 5, respectively. Furthermore, the performance of the inventive coating strongly outperformed that of Comparative Example 1 even though the thickness of the inventive coating was almost half that of the coating thickness employed in Comparative Example 1. Clearly the novel formulations of the present invention attained improved functional performance.

Example 2

The 58A and 87A coatings with the compositions presented in Table 1 were further exposed to a battery of performance tests, in which the tests conditions and procedures are parts of various OEM specifications previously described. Another coating formulation of the present invention denoted as "47A" was also included in the extended testing. The 47A slurry formulation was a Li doped K silicate-based Cr-free formulation, which utilized the Type AA aluminum powder and had an aluminum content of 35 wt %. The 47A slurry contained the silicate and aluminum in a ratio of about 0.42:1 Coatings formed from the 47A slurry had a thickness ranging from about 0.9-1.1 mils.

Figure 16A:
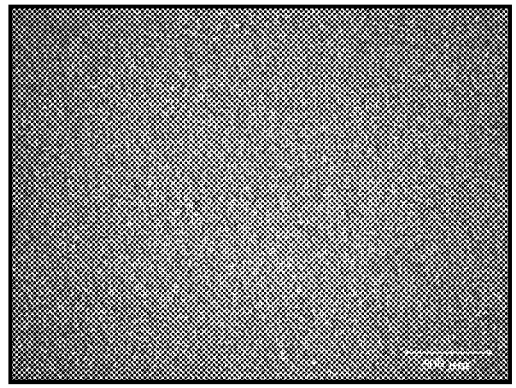
FIGS. 16a-16c show surface morphology of various coating formulations of the present invention at a magnification of ×40.
Figure 16B:
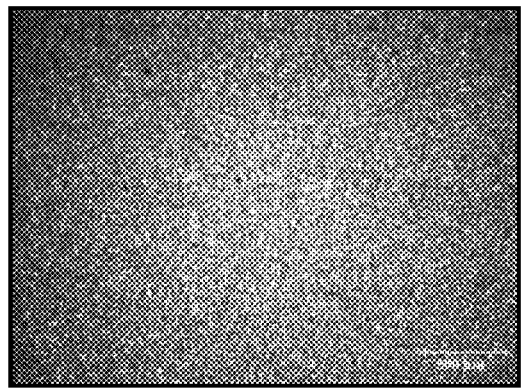
Figure 16C:
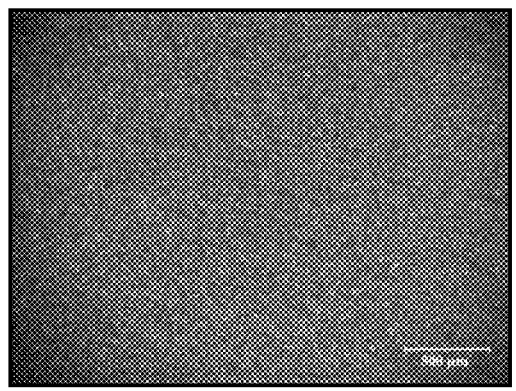

As with the inventive coating of Example 1, all three slurries of this Example 2 provided uniform coverage of the substrates, forming dense and defect-free coatings, as demonstrated by optical microscope data (magnification 40×) in FIGS. 16(*a*)-16(*c*), respectively. Same as all coatings of the present invention (see as an example coating 32A), the 47A, 58A and 87A coatings also showed improved adhesion in comparison to all of the coatings in Comparative Examples 1-5.

Superior performance in corrosion resistance testing was observed for the inventive coatings. FIGS. 17(*a*), 17(*b*) and 17(*c*) correspond to the 47A, 58A and 87A coatings and show an absence of red rust in the scribe or field after the 47A, 58A and 87A coatings were exposed to the salt fog for 1000 hrs. FIGS. 17(*d*) and 17(*e*) correspond to the 58A and 87A coatings and show an absence of red rust in the scribe or field after 1700 hrs of the salt fog exposure. Thickness of the coatings shown in FIGS. 17(*a*) through 17(*e*) was in the range of 1.0-1.4 mils.

Figure 18A:
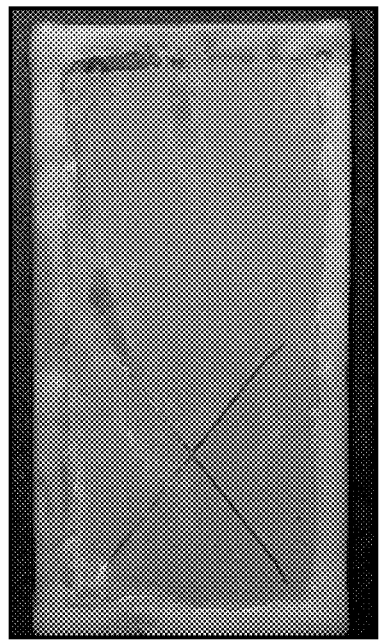
FIGS. 18(a) and 18(b) show results of heat plus salt spray test for the coatings of the present invention.
Figure 18B:
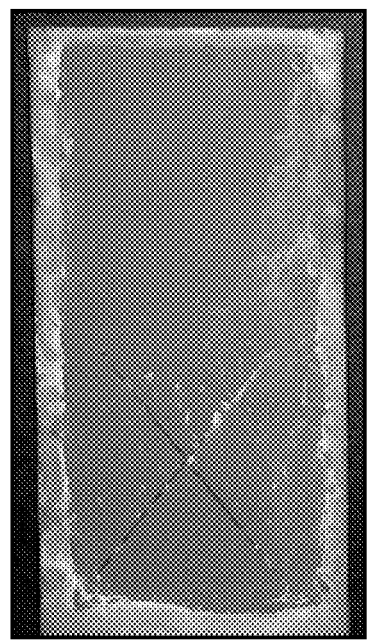

Similar high performance results for the coatings of the present invention were achieved for the heat plus salt spray test. FIGS. 18 (*a*) and 18 (*b*) show no red rust formation in the scribe and field, and no significant amounts of white sacrificial corrosion products from the heat plus salt spray test, thereby far outperforming the same thickness coating in Comparative Example (1).

It was also found out that all coatings of the present invention exhibited superior heat resistance, characterized by no observed coating color change, blistering or delamination from a substrate after prolonged heat exposure (over 500 hrs) at 850° F.

Example 3

Figure 21:
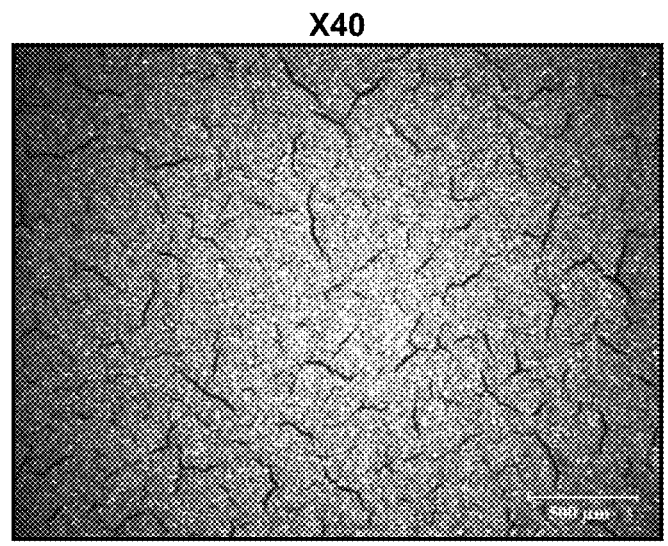
FIG. 21 shows optical microscope picture at a magnification of ×40 of the coating of Comparative Example 1 coating surface.

The coatings of the present invention were further tested and compared against the performance of the coating of Comparative Example 1. Hot water immersion tests were conducted in which coatings on 1010 panels were placed in boiling water for 10 min, then cooled and air-dried for 3 hrs, followed by cross-hatch and bend adhesion tests. FIGS. 19(*a*) and 19(*b*) show results of cross-hatch adhesion tests (optical microscope at 6× magnification) of the coating (2.1 mils thick) of Comparative Example 1 before and after hot water immersion testing, and FIGS. 20(*a*) and 20(*b*) show results of cross-hatch adhesion testing (optical microscope at 6× magnification) of the 58A coating of the present invention (1.3 mils thick). As seen from these data, the coating of Comparative Example 1 deteriorated, whereas the Li doped K silicate binder based coatings of the present invention were not affected by boiling water exposure. Not to be bound by any theory, the inferior performance of the coatings of Comparative Example 1 in this test may be attributed to their morphology. Specifically, significant "mud-cracking" was observed for layers of the coating of Comparative Example 1, as observed under optical microscope (see FIG. 21). Furthermore, water penetration through such cracks may deteriorate adhesion to the substrate. At the same time, the coatings of the present invention that were free of "mud cracks" (see FIG. 16), showed excellent resistance to water penetration thus preserving good adhesion properties.

Figure 22A:
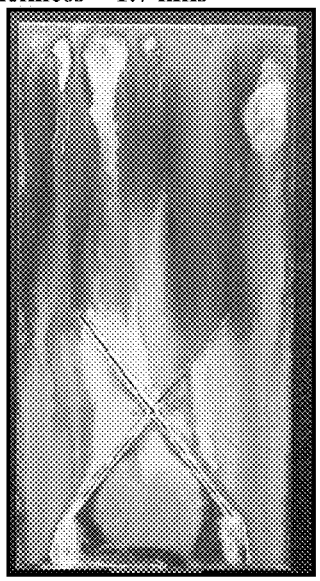
FIGS. 22(a), 22(b) and 22(c) show the results for the cyclic heat and salt exposure test for one of the coatings of the present invention in comparison to other coatings that were tested.
Figure 22B:
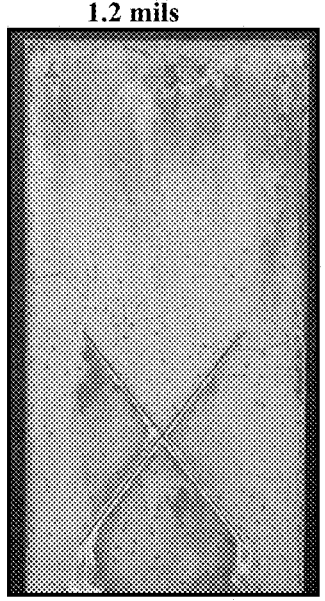
Figure 22C:
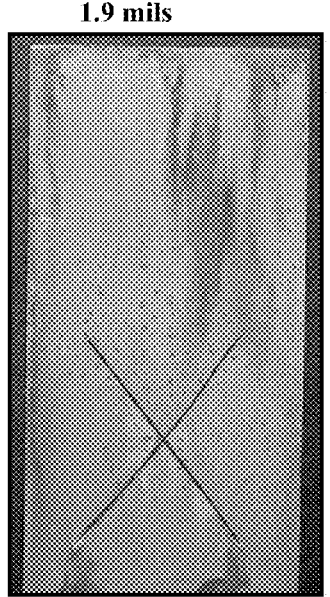

Next, cyclic heat and salt spray exposure tests were performed. The SermeTel® W coating, a chromate-phosphate based coating, was used as a benchmark, as it is well known to meet OEM requirements for the cyclic heat plus salt spray test. The test used the coated & scribed 4130 steel panels. The samples were heated at 850° F. for 7.5 hrs, cooled to a room temperature and then placed into a salt fog (per ASTM B117) for 15.5 hrs. The samples were thereafter rinsed with de-ionized $H_2O$ and dried prior to going into the next thermal part of the cycle. A total of 10 such cycles were performed. FIGS. 22(*a*), 22(*b*) and 22(*c*) show the results for the coating of Comparative Example 1 at 1.7 mils thickness, the 58A coating of the present invention at 1.2 mils thickness and benchmark coating SermeTel® W at 1.9 mils thickness, respectively. As can be seen, the 58A coating did not deteriorate and performed much better than the coating of Comparative Example 1 that was 0.5 mils thicker than the 58A coating: the 58A coating showed less white corrosion and less darkening than the coating of Comparative Example 1. Advantageously, the 58A coating was observed to behave similarly to that of SermeTel® W benchmark coating.

Different fluid immersion tests were also performed, as resistance to standard engine fluids is needed for a coating service in aircraft engine applications. The Fuel B immersion test was performed on coated 1010 panels that were immersed for 24 hrs at room temperature. The Hot Oil resistance test was performed on coated 1010 panels that were immersed in SAE di-ester test fluid at 400° F. for 8 hrs. No blistering, spallation or any deterioration of adhesion of the 58A coating was observed after it was subjected to immersion in Fuel B and hot SAE Di-ester Test Fluid. The 58A coating behaved similarly to the coating of Comparative Example 1 and SermeTel® W, which was also used as a benchmark for these immersion tests.

Erosion resistance (ER) was also performed using 50 μm $Al_2O_3$ media at 25 psi. ER was determined on the basis of the amount $Al_2O_3$ media needed to erode a predetermined amount of coating material down to the substrate and expressed in the units of coating weight loss per gram of $Al_2O_3$. Again, the SermeTel® W chromate-phosphate based coating, was used as a benchmark, as it is known to meet OEM ER requirements. It was determined that the Li doped K silicate binder based coatings performed similarly to the coating of Comparative Example 1 and SermeTel® W coatings. For example, the ER results were determined to be 160 μg/g, 150 μg/g and 200 μg/g of Al2O3 erodent media for 58A, the coating of Comparative Example 1 and SermeTel W, respectively.

Example 4

Stability and shelf life data for the developed Li doped K silicate binder based Cr-free slurries of Example 1 and Example 2 were evaluated. The results were presented in Table 3. As seen from the data, all slurries were stable: no agglomeration of Al particles was observed, including those of the finer, more active Type SA particles (employed in 87A). The results demonstrated sufficient shelf life, which allows the inventive slurries to be employed as a one-part slurry composition.

TABLE 3

Lithium doped Potassium Silicate-Based Cr-free Slurries of Present Invention: Stability & Shelf life

| Slurry | Shelf life | pH | D50, μm | D90, μm |
| --- | --- | --- | --- | --- |
| 32D | as made | 11.60 | 5.8 | 13.2 |
|  | 3 months | 11.63 | 5.5 | 12.5 |
|  | 6 months | 11.53 | 5.5 | 13.0 |
| 47A | as made | 11.50 | 6.0 | 13.2 |
|  | 4 months | 11.52 | 5.5 | 13.1 |
|  | 6 months | 11.52 | 5.5 | 12.9 |
| 58A | as made | 11.55 | 5.7 | 13.1 |
|  | 3.5 months | 11.53 | 5.1 | 12.4 |
|  | 5.5 months | 11.50 | 5.2 | 12.4 |
| 87A | as made | 11.57 | 4.5 | 9.0 |
|  | 2.5 months | 11.53 | 4.3 | 8.2 |
|  | 5 months | 11.52 | 4.2 | 8.2 |

In the present invention, it has been found that the inventive formulation of a Cr-free one-part slurry is capable of forming a basecoat-only layer capable of high performance that meets the most stringent OEM specifications. The Examples demonstrated that the inventive formulation outperforms other types of silicate-based Cr-free coatings at a coating thickness substantially less than that of the other coatings. Specifically, the Examples demonstrated that the synergistic combination of lithium ions and potassium ions in a silicate based binder matrix is unique and outperformed individual alkali metal silicate based binders, as well as silicate binders with other combinations of alkali metals.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. An aqueous slurry composition for the production of a coating on a substrate comprising:
   a binder comprising an aqueous solution of lithium doped potassium silicate, the binder characterized by an absence of chromium; and
   an aluminum or aluminum alloy powder incorporated into the binder, wherein the aluminum or the aluminum alloy powder and the binder are contained as a one-part composition;
   wherein the aluminum or aluminum alloy powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns.

2. The aqueous slurry composition of claim 1, wherein the lithium doped potassium silicate and aluminum or aluminum alloy powder are contained in a weight ratio of about 0.18:1 to 0.46:1 silicate to aluminum or aluminum alloy powder.

3. The aqueous slurry composition of claim 1, wherein the aluminum or aluminum alloy powder in the slurry is between about 35-45 weight percent (wt %) based on the total weight of the slurry and the silicate to aluminum is contained in a ratio of about 0.22:1 to 0.37:1 by weight.

4. The aqueous slurry composition of claim 1, further comprising chromium-free corrosion inhibitors.

5. The aqueous slurry composition of claim 1,
   further comprising the aluminum alloy powder selected from the group consisting of aluminum-silicon, aluminum-copper and aluminum-magnesium.

6. An article of manufacture comprising a substrate with a coating formed from a slurry with a composition according to claim 1.

7. An aqueous slurry composition for the production of a coating on a substrate comprising:
   a binder comprising an aqueous solution of lithium doped potassium silicate, the binder characterized by an absence of chromium; and
   an aluminum or aluminum alloy powder incorporated into the binder, wherein the aluminum or the aluminum alloy powder and the binder are contained as a one-part composition;
   wherein the aluminum or aluminum alloy powder content in the slurry is between about 30-50 weight percent (wt %) based on the total weight of the slurry and further comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns.

8. An aqueous slurry composition for the production of a coating on a substrate, comprising:
   a binder comprising an aqueous solution of lithium doped potassium silicate, the binder characterized by an absence of chromium; and
   an aluminum or aluminum alloy powder incorporated into the binder, wherein the aluminum or the aluminum alloy powder and the binder are contained as a one-part composition;
   wherein the lithium-doped potassium silicate comprises potassium and lithium in a ratio of about 3:1 to 20:1 by weight as $K_2O:Li_2O$, and further wherein the ratio of silicate to potassium is in a ratio of about 2:1 to 3:1 by weight as $SiO_2:K_2O$.

9. The aqueous slurry composition of claim 8, wherein the lithium-doped potassium silicate comprises potassium and lithium in the ratio of about 7:1 to 11:1 by weight as $K_2O:Li_2O$, and further wherein the ratio of silicate to potassium is of about 2.4:1 to 2.8:1 by weight as $SiO_2:K_2O$.

10. A coating composition for a substrate comprising:
    a ceramic matrix not containing chromium, said matrix formed by a silicate binder and a plurality of aluminum powder particles embedded within said matrix;
    wherein said silicate binder is potassium silicate doped with lithium;
    of
    wherein the aluminum powder comprises a particle size distribution characterized in that the $50^{th}$ percentile of the particle size distribution has a diameter of between about 4 to 7 microns and the $90^{th}$ percentile of the particle size distribution has a diameter of less than or equal to about 11.5-15.5 microns.

11. The coating composition of claim 10, wherein the silicate and aluminum are contained in a weight ratio of about 0.18:1 to 0.46:1 silicate to aluminum.

12. The coating composition of claim 10, wherein the coating is capable of being modified to a conductive coating with sacrificial corrosion protection.

13. The coating composition of claim 10 produced from an aqueous slurry, wherein the aluminum powder is contained in the slurry in an amount between about 30-50 weight percent (wt %) based on the total weight of the slurry.

14. The coating composition of claim 10, produced from an aqueous slurry, wherein the aluminum powder in the slurry is between about 35-45 weight percent (wt %) based on the total weight of the slurry, and the lithium doped potassium silicate to aluminum weight ratio is about 0.22:1 to 0.37:1.

15. A coating composition for a substrate comprising:
    a ceramic matrix not containing chromium, said matrix formed by a silicate binder and a plurality of aluminum powder particles embedded within said matrix;
    wherein said silicate binder is potassium silicate doped with lithium
    wherein the aluminum powder comprises a particle size distribution characterized in that the $50^{th}$ percentile of the particle size distribution has a diameter of between about 3.9 to 4.5 microns and the $90^{th}$ percentile of the particle size distribution has a diameter of less than or equal to about 9.0 microns.

* * * * *